Aug. 11, 1964 G. ULRICH 3,143,907
FACE DRIVING CHUCKS FOR MACHINE TOOLS
Filed July 14, 1959
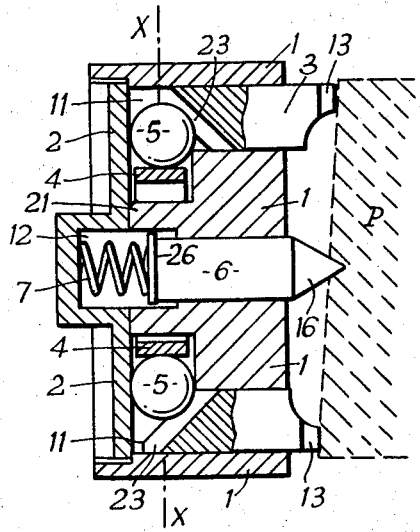
Fig. 1.
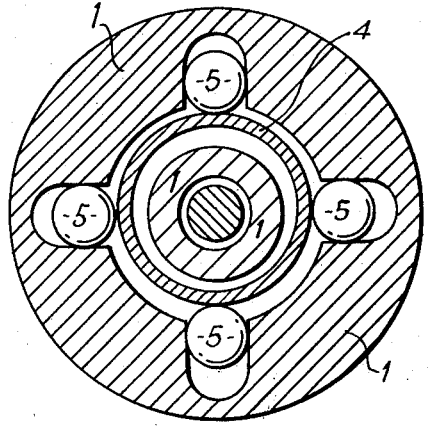
Fig. 2.
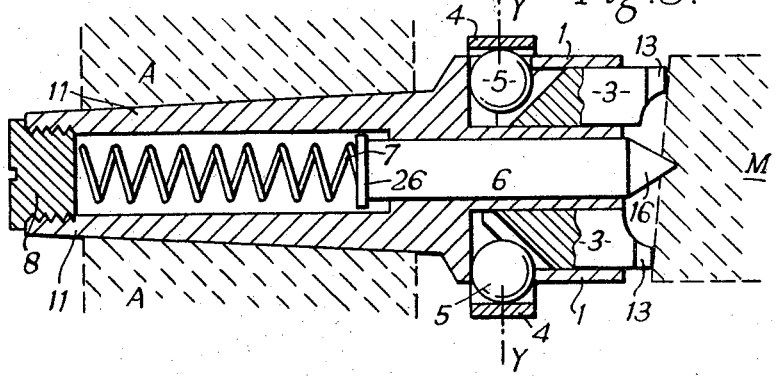
Fig. 3.
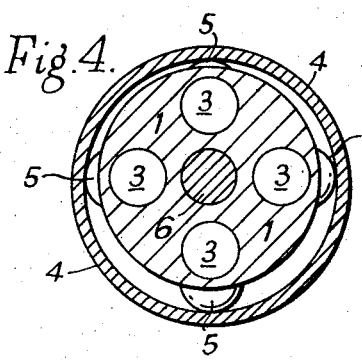
Fig. 4.
Fig. 5.
Fig. 6.
INVENTOR
Giovanni Ulrich
BY
Richards & Geier
ATTORNEYS

United States Patent Office 3,143,907
Patented Aug. 11, 1964

3,143,907
FACE DRIVING CHUCKS FOR MACHINE TOOLS
Giovanni Ulrich, 14 Via Forcellini, Padau, Italy
Filed July 14, 1959, Ser. No. 826,951
Claims priority, application Italy July 25, 1958
3 Claims. (Cl. 82—40)

In machine tools, and especially in lathes, when it is not possible to clamp the workpiece in a faceplate provided with jaws, the workpiece is centered between two centres and rotated by means of a carrier or other devices according to its shape.

The preparation of the said devices always entails an expense and a loss of time which have repercussions on the cost of machining and much more so when a single workpiece or a few workpieces is or are concerned and the machining is simple and requires little time.

Therefore, one object of the present invention is to provide a chuck which enables any part or workpiece whatsoever to be rotated merely by axial pressure exerted on the workpiece. The pressure is exerted through the agency of pins having a chisel-shaped or toothed ends which automatically clamp the workpiece with a force which is all the more the greater as the driving or entrainment effort increases.

According to the invention, I provide a face driving chuck for machine tools, comprising a body, a centering pin axially slidable in the body, two or more angularly-spaced parallel workpiece-driving pins which are spaced equidistantly from the centering pin and are slidable in holes in the body, a cylindrical recess formed in the rear part of the body and closed by a cover, a rearwardly-extending boss in the body which is of less depth than the recess, the cover being in contact with the rear end of the boss, a floating ring which is arranged in the recess around the boss and the internal diameter of which is larger than that of the boss, the front ends of the driving pins being chisel-shaped or toothed while their rear ends comprise recesses in the form of dihedrals, inclined towards the axis of the chuck, a ball disposed in correspondence with each dihedral and thus housed between the ring, the cover and the dihedral, and resilient means for urging the centering pin outwards towards the workpiece.

A modified chuck comprises a body having a tapered shank, the shank and the body being bored axially, one or more paralled peripheral holes in the body which are equidistant from the axis of the body and are spaced angularly with respect to one another, a centering pin having a tapered centering tip being arranged in the axial bore, a spring housed at the rear of the centering pin and mounted between the pin and an abutment in the axial bore in the shank, workpiece-driving pins slidable in the peripheral holes and provided with front ends which are adapted to engage the workpiece and are chisel-shaped or toothed, the rear ends of the pins being provided with recesses in the form of dihedrals inclined towards the axes of the pins, a radial hole in the body in correspondence with each peripheral hole and tangential to the bottom thereof, a ball seated in the dihedral of each of the driving pins, and a floating outer ring adapted to retain the balls, the internal diameter of the ring being larger than the external diameter of the body.

Two constructional forms of the invention are shown, by way of example, in the accompanying drawings, wherein:

FIG. 1 is a view in longitudinal section of a driving chuck adapted to be fitted to a faceplate with or without self-centering jaws;

FIG. 2 is a cross-section of the same chuck on the line X—X in FIG. 1;

FIG. 3 is a view in longitudinal section of a modified driving chuck adapted to be clamped in the Morse taper hole in the shaft of the machine tool;

FIG. 4 is a cross-section of the chuck shown in FIG. 3 on the line Y—Y in FIG. 3; and FIGS. 5 and 6 respectively are a front view and a plan view of a driving pin.

Referring first to FIGS. 1 and 2.

Against the workpiece P to be rotated there is pressed a driving chuck of the type adapted to be mounted on a faceplate comprising jaws (not shown) or fixed in any manner whatsoever. The chuck comprises a cylindrical steel body 1 in the rear of which there is a cylindrical recess 11. The body also has a central boss 21 which is shorter than the depth of the recess 11.

The body 1 and its boss 21 are drilled axially and the hole is counterbored over a certain portion of the length of the boss thus providing a circular shoulder in the boss. The recess 11 is closed by a threaded cover 2 locked against the boss 21.

In the cylindrical body 1 there are formed two or more holes (four are shown in the figure) which are parallel to the axis of rotation of the chuck, equidistant from the latter and angularly disposed with respect to one another. Driving pins 3 are housed in the holes and each pin is formed at its front end with a chisel-shaped or toothed end 13 displaced by an amount S with respect to the axis (FIGS. 5 and 6). At the rear, each pin has a recess of angular cross section with two plane walls forming an inclined dihedral 23.

A ring 4 is freely mounted in the chamber 11 and has an internal diameter larger than that of the boss 21. Externally of the ring balls 5 are mounted in correspondence with the pins 3. The diameters of the balls are such that the balls may be housed exactly between the rear dihedrals of the pins 3, the cover 2 and the outer surface of the ring 4.

A centering pin 6 is slidable centrally in the block 1 along the axis of the block and its conical tip 16 serves to centre the workpiece P to be turned. The pin is provided at the rear with a circular projection 26 which limits the travel of the pin when it strikes against the above mentioned shoulder in the boss 21.

A coil spring 7 compressed between a seat 12 in the cover 2 and the pin 6 urges the tip 16 of the latter constantly outwards into a tapered hole previously made in the workpiece.

The operation of the chuck described above is as follows:

The workpiece P, centred on the conical tip of the centre 6, is thrust against the chuck by means of the tailstock (not shown) of the machine tool. Owing to the effect of the dihedrals in the driving pins 3, which are free to slide axially and that of the balls 5, radial thrusts of equal value are transmitted to the ring 4 and directed towards the centre. If the surface of the workpiece P is plane and normal to the axis of rotation, the sliding movement of the pins 3 will be identical in every case and the ring 4 will be centred, whereas if the surface is inclined (as shown in FIGURE 1) or even merely irregular, there will be a sliding movement of different value from pin to pin and the ring 4 will assume an eccentric position.

Since the chisel-shaped or toothed ends 13 of the pins 3 are displaced by a value S with respect to the axes of the pins, it follows that the force rotating the workpiece will tend to make the pins rotate. Such rotation, however, is opposed by the balls 5 seated in the dihedrals 23 and clamped between the latter and the cover 2 and supported by the ring 4. Owing to the dihedrals and to their inclination, the result will be a helical forward sliding of the pins 3, the chisel-shaped or toothed tips of which will be applied with greater force against the workpiece P, thus ensuring the driving of the latter. The automatic forcible application of the pins 3 against the workpiece will be in direct proportion to the required driving force.

The chuck shown in FIG. 3 is based on the same principle as the one shown in FIGS. 1 and 2, but has differences which make it suitable to be fitted and clamped in the tapered hole at the end of the shaft A of a lathe or other machine tool. To this end, the cylindrical body 1 has a rearwardly-extending and externally tapered tang or tail 11 having "Morse" taper or a taper of another kind. In the front of the body 1 there are two or more cylindrical parallel seating holes equidistant from the axis and arranged angularly with respect to one another, four such holes being shown in the figure. A radial hole, tangential to the bottom of each of the seating holes, permits the introduction of a ball 5 into the seating hole and the balls are held in place by means of the loosely mounted outer ring 4, the internal diameter of which is greater than the external diameter of the body 1.

As in the construction shown in FIGS 1 and 2, the balls are clamped between the ring 4, the bottom walls of the seating holes and the dihedrals 23 of the pins 3 and the ring is automatically disposed concentrically or eccentrically in relation to the body 1 according to the inclination or lack of inclination of the front surface of the workpiece P and to its planarity.

In this case, the inclination of the dihedrals of the pins 3 (FIGS. 5 and 6) is oriented in the opposite direction from that of the pins of the chuck previously described; that is to say, whereas in the chuck shown in FIG. 1 the dihedrals face towards the centre, in the chuck shown in FIG. 3 they face outwards.

The centering pin 6 with its conical tip 16 slides axially in the part 1, being thrust forwards by a coil spring 7 arranged between the pin and a threaded plug 8 closing the drilled end of the tang 11.

The operation of this chuck is identical with that previously described.

It is obvious that the shape and constructional details of the chucks and also the number and arrangement of the pins 3 may be varied.

I claim:

1. A driving chuck, comprising a body having an axial hole, a circular shoulder in said axial hole, a recess and a plurality of holes equidistant from and parallel to said axial hole and angularly disposed relatively to each other, driving pins in the last-mentioned holes, each of said pins having a front chisel-shaped end displaced in relation to the pin axle and a rear angular end with two plane walls forming an inclined dihedral; balls mounted in said recess in correspondence with said pins and adapted to engage the rear dihedrals of said pins, a freely mounted ring engaging said balls, a centering pin slidable in said axial hole and having a workpiece-centering front tip and a rear end having a projection adapted to engage said shoulder, and a coiled spring engaging the rear end of said centering pin.

2. A driving chuck, comprising a cylindrical body having a rear central boss, an axial hole and a cylindrical recess enclosing said boss, said boss having a circular shoulder in said hole; a cover closing said recess and engaging said boss, said body further having a plurality of holes equidistant from and parallel to said axial hole and angularly disposed relatively to each other, driving pins in the last-mentioned holes, each of said pins having a front chisel-shaped end displaced in relation to the pin axle and a rear angular end with two plane walls forming an inclined dihedral; a ring freely mounted in said recess and having an inner diameter which is larger than that of said boss, balls mounted in said recess externally of said ring in correspondence with said pins, said balls being located between the rear dihedrals of said pins, said cover and the outer surface of said ring, a centering pin slidable in said axial hole and having a workpiece-centering front tip and a rear end having a projection adapted to engage said shoulder, and a coiled spring engaging said cover and the rear end of said centering pin.

3. A driving chuck, comprising a cylindrical body, a tapering tail connected with said cylindrical body, said cylindrical body and said tapering tail having an axial hole, said cylindrical body having a plurality of holes equidistant from and parallel to said axial hole and angularly disposed relatively to each other, a recess being located between said tapering tail and said cylindrical body adjacent the rear ends of the last-mentioned holes, said tapering tail having a circular shoulder in said axial hole, a plug carried by said tapering tail and closing said axial hole, driving pins in the last-mentioned holes, each of said pins having a front chisel-shaped end displaced in relation to the pin axle and a rear angular end with two plane walls forming an inclined dihedral; balls mounted in said recess in correspondence with said pins and adapted to engage the rear dihedrals of said pins, a freely mounted ring enclosing said balls, a centering pin slidable in said axial hole and having a workpiece-centering front tip and a rear end having a projection adapted to engage said shoulder, and a coiled spring engaging said plug and the rear end of said centering pin.

References Cited in the file of this patent

UNITED STATES PATENTS

| 2,897,708 | Kostyrka | Aug. 4, 1959 |
| 2,971,413 | Rohm | Feb. 14, 1961 |

FOREIGN PATENTS

| 725,439 | Great Britain | Mar. 2, 1955 |